United States Patent
Chen et al.

(10) Patent No.: US 10,423,183 B2
(45) Date of Patent: Sep. 24, 2019

(54) METHOD OF BALANCING A SUPPLY CURRENT AND DEVICE FOR SUPPLYING POWER

(71) Applicant: EMC IP Holding Company LLC, Hopkinton, MA (US)

(72) Inventors: Sean Xu Chen, Shanghai (CN); Jesse Xizhi Cui, Shanghai (CN); Tao Yang, Shanghai (CN); Haifang Zhai, Shanghai (CN); Alice Aiqin Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/955,117

(22) Filed: Apr. 17, 2018

(65) Prior Publication Data

US 2018/0299916 A1    Oct. 18, 2018

(30) Foreign Application Priority Data

Apr. 17, 2017    (CN) .......................... 2017 1 0249895

(51) Int. Cl.
| | |
|---|---|
| G05F 1/625 | (2006.01) |
| H02M 7/155 | (2006.01) |
| G05F 1/66 | (2006.01) |
| G06F 1/30 | (2006.01) |
| G06F 1/28 | (2006.01) |
| H02M 7/483 | (2007.01) |

(Continued)

(52) U.S. Cl.
CPC ................ *G05F 1/625* (2013.01); *G05F 1/66* (2013.01); *G06F 1/28* (2013.01); *G06F 1/305* (2013.01); *H02J 1/10* (2013.01); *H02J 7/00* (2013.01); *H02J 7/0063* (2013.01); *H02J 7/0065* (2013.01); *H02J 2007/0067* (2013.01); *H02M 7/1557* (2013.01); *H02M 7/483* (2013.01)

(58) Field of Classification Search
CPC ..... H02M 7/1557; H02M 7/483; G05F 1/625; G05F 1/66; G06F 1/28; G06F 1/305; H02J 7/0063; H02J 7/0065; H02J 7/00; H02J 1/10; H02J 2007/0067
USPC ................................ 323/280–289, 304, 315
See application file for complete search history.

(56) References Cited

U.S. PATENT DOCUMENTS

| | | | | |
|---|---|---|---|---|
| 5,959,443 A | * | 9/1999 | Littlefield | .......... H02M 3/1563 323/283 |
| 6,356,057 B1 | | 3/2002 | Shilo et al. | |

(Continued)

*Primary Examiner* — Fred E Finch, III
*Assistant Examiner* — Nusrat Quddus
(74) *Attorney, Agent, or Firm* — BainwoodHuang

(57) ABSTRACT

Embodiments of the present disclosure relates to a method and device for balancing a supply current. In one embodiment, a current supply current for a load is detected. A first signal representing the current supply current is transmitted to a digital logic module. A second signal representing a maximum supply current and a third signal representing a minimum supply current are received from the digital logic module. A subsequent supply current for the load is determined based on the current supply current, the maximum supply current and the minimum supply current. By using the method and device according to the embodiments of the present disclosure, the supply currents of a plurality of power supply units for the load can be balanced a simple way with a low hardware cost.

20 Claims, 6 Drawing Sheets

(51) Int. Cl.
   *H02J 7/00* (2006.01)
   *H02J 1/10* (2006.01)

(56) References Cited

U.S. PATENT DOCUMENTS

| | | | |
|---|---|---|---|
| 6,470,084 B1* | 10/2002 | Van Zanten | H03F 1/0277 |
| | | | 379/413 |
| 6,904,541 B1 | 6/2005 | MacArthur et al. | |
| 7,372,693 B1 | 5/2008 | Feroli et al. | |
| 7,656,141 B1* | 2/2010 | Granat | H02M 3/158 |
| | | | 323/284 |
| 7,830,770 B1 | 11/2010 | Linnell | |
| 7,893,678 B2* | 2/2011 | Blanken | H02M 3/156 |
| | | | 323/285 |
| 8,729,870 B2* | 5/2014 | Crawford | H05B 33/0815 |
| | | | 315/291 |
| 9,485,655 B1 | 11/2016 | Pirrotta | |
| 9,900,942 B1* | 2/2018 | Eggermont | H02M 1/088 |
| 2004/0051510 A1* | 3/2004 | Saggini | H02M 3/157 |
| | | | 323/282 |
| 2006/0071639 A1* | 4/2006 | Ross | H02J 7/0063 |
| | | | 320/116 |
| 2006/0238174 A1* | 10/2006 | Russell | H05B 33/0818 |
| | | | 323/229 |
| 2010/0320949 A1* | 12/2010 | Fotherby | H02M 7/48 |
| | | | 318/400.26 |
| 2014/0159689 A1* | 6/2014 | Chen | H02M 3/156 |
| | | | 323/282 |
| 2016/0036324 A1* | 2/2016 | Hofmann | H02M 3/156 |
| | | | 315/210 |
| 2016/0164400 A1* | 6/2016 | Rinne | H02M 3/157 |
| | | | 323/234 |

* cited by examiner

METHOD OF BALANCING A SUPPLY CURRENT AND DEVICE FOR SUPPLYING POWER

RELATED APPLICATIONS

This application claim priority from Chinese Patent Application Number CN201710249895.6, filed on Apr. 17, 2017 at the State Intellectual Property Office, China, titled "METHOD FOR BALANCING SUPPLIED CURRENTS AND APPARATUS FOR SUPPLYING POWER" the contents of which is herein incorporated by reference in its entirety.

FIELD

Embodiments of the present disclosure relate to power supply technologies, and more specifically, to a method of balancing a supply current and a device for supplying power.

BACKGROUND

In an electronic device, such as a data storage device and the like, a plurality of power supply units are often used to supply power to the electronic device in need of massive power consumption. For a plurality of power supply units, there exists a situation that the supply currents of the power supply units are unbalanced. Therefore, the output power of a certain power supply unit may exceed its maximum rated output current, which can easily reduce the service life of the power supply unit. In a more severe situation, it may cause a power supply unit failure. Thus, the supply currents of the plurality of power supply units need to be balanced.

SUMMARY

In general, example embodiments of the present disclosure relates to a method of balancing a supply current and a device for supplying power.

According to a first aspect of the present disclosure, there is provided a method of balancing a supply current. The method comprises: detecting a current supply current for a load; transmitting, to a digital logic module, a first signal representing the current supply current; receiving, from the digital logic module, a second signal representing a maximum supply current and a third signal representing a minimum supply current; and determining a subsequent supply current for the load based on the current supply current, the maximum supply current and the minimum supply current.

In some embodiments, wherein determining a subsequent supply current for the load comprises: determining an average supply current based on the maximum supply current and the minimum supply current; and determining the subsequent supply current based on the average supply current and the current supply current.

In some embodiments, determining an average supply current comprises: computing a median of the maximum supply current and the minimum supply current as the average supply current.

In some embodiments, determining a subsequent supply current for the load comprises: determining a difference between the average supply current and the current supply current; and determining the subsequent supply current based on the difference.

In some embodiments, determining the subsequent supply current based on the difference comprises: in response to the difference being below a predetermined threshold, maintaining the current supply current as the subsequent supply current.

In some embodiments, determining the subsequent supply current based on the difference comprises: in response to the difference being above a predetermined threshold and the average supply current being above the current supply current, increasing the supply current by a first current amount as the subsequent supply current.

In some embodiments, determining the subsequent supply current based on the difference comprises: in response to the difference being above the predetermined threshold and the average supply current being below current the supply current, decreasing the supply current by a second current amount as the subsequent supply current.

In some embodiments, increasing the supply current by a first current amount comprises: increasing an output voltage for the load by a first voltage amount.

In some embodiments, decreasing the supply current by a second current amount comprises: decreasing an output voltage for the load by a second voltage amount.

According to a second aspect of the present disclosure, there is provided a device for supplying power, comprising: a power output circuit, a current sensing circuit and a microprocessor. The power output circuit is configured to output a current supply current to a load. The current sensing circuit is configured to sense the current supply current. The microprocessor configured to: receive, from the current sensing circuit, a first signal representing the supply current; transmit the first signal to a digital logic module; receive, from the digital logic module, a second signal representing a maximum supply current and a third signal representing a minimum supply current; and determine a subsequent supply current for the load based on the current supply current, the maximum supply current and the minimum supply current.

According to a third aspect of the present disclosure, there is provided a power source, comprising: a plurality of the above devices for supplying power and a digital logic circuit. The digital logic circuit is configured to receive a plurality of current supply currents, to determine, based on the plurality of current supply currents, the second signal representing the maximum supply current and the third signal representing the minimum supply current, and to transmit the second and third signals to the plurality of devices.

According to a fourth aspect of the present disclosure, there is provided a computer program product being tangibly stored on a non-transient computer-readable medium and comprising machine-executable instructions which, when executed, cause a machine to perform steps of the above method.

It should be understood that the Summary does not intend to identify key or essential features of the embodiments of the present disclosure, nor is it intended to limit the scope of the present disclosure. Other features of the present disclosure will become easier to understand through the description below.

BRIEF DESCRIPTION OF THE DRAWINGS

Through a more detailed description of some embodiments of the present disclosure in the accompanying drawings, the above and other advantages, features, and objects of the present disclosure will become more apparent, in which.

Throughout the drawings, same or similar reference signs refer to same or similar elements.

DETAILED DESCRIPTION OF EMBODIMENTS

The principles of the present disclosure are now described with reference to some example embodiments. It can be appreciated that those embodiments are described only for the purpose of illustrating and assisting those skilled in the art to understand and implement the present disclosure, but are not intended for limiting the scope of the present disclosure in any manner. The contents of the present disclosure described herein can be implemented by various ways except the ways described below.

As used herein, the term "includes" and its variants are to be read as open-ended terms which mean "includes, but is not limited to." The term "based on" is to be read as "based at least in part on." The term "one embodiment" is to be read as "at least one embodiment." The term "a further embodiment" is to be read as "at least one further embodiment." The terms "first," "second," "third" and the like are only for distinguishing the objects referred to without limiting the order of these objects.

The electronic device, such as the memory and the like, usually consumes a large amount of electricity. Therefore, a plurality of power supply units are often used to supply power to the electronic device, and output currents of the plurality of power supply units need to be balanced. A plurality of methods for balancing the supply currents exist in the prior art, but these methods are complicated and suffer from high costs.

For example, a traditional method of balancing currents includes using an analog current sharing bus connected to all power supply units, in which only the power supply unit having the maximum output current drives the voltage level of the current sharing bus, while the other power supply units correspondingly change their output currents based on the voltage of the current sharing bus. The method requires a very complicated analog circuit, which is unstable and susceptible to bus noises.

For example, another traditional method of balancing currents includes using a communication current sharing bus connected to all power supply units, such as Internal Integrated Circuit (I²C) bus, Universal Asynchronous Receiver/Transmitter (UART) bus or Controller Area Network (CAN) bus. These buses transmit current sharing information with each other and correspondingly adjust the currents. The method requires a very intricate firmware design and a microcontroller with a high performance. Besides, the method acts slowly in response to sudden load changes, as it needs a large amount of time for intercommunication and adjustment.

Figure 1:
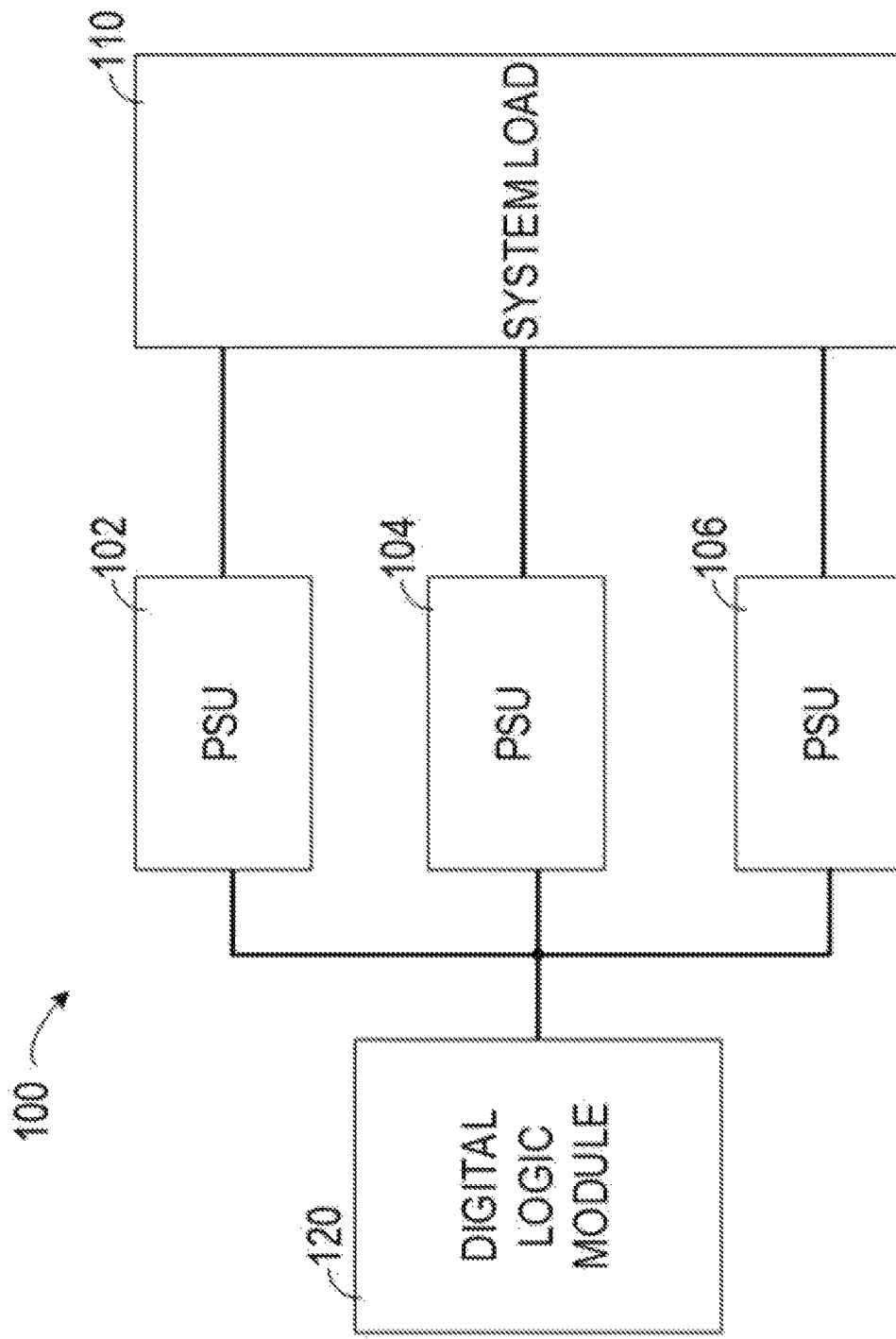
FIG. 1 is a simplified block diagram of a power supply system in which embodiments of the present disclosure can be implemented.

Embodiments of the present disclosure provide a method of balancing currents. The method uses a simple digital logic module, for example AND gate and OR gate, to balance supply currents of the plurality of power supply units without a big change to the power supply units. FIG. 1 illustrates a simplified block diagram of a power supply system 100 in which some embodiments of the present disclosure can be implemented. The power supply system 100 comprises a plurality of power supply units (PSUs) collectively supplying power to a system load 110, a digital logic module 120 and a system load 110. FIG. 1 illustrates three PSUs 102, 104 and 106. It can be understood that two or more PSUs can also be utilized. The PSU can be, for example, Uninterruptible Power Supply (UPS) or battery cell. From the perspective of a single power supply unit (for example the PSU 102), the power supply unit supplies power to the system load 110 via the single power supply circuit, whereas from the perspective of the system load 110, the system load 110 receives power from the plurality of power supply units via a plurality of power supply circuits. Correspondingly, from the perspective of the single power supply unit (for example the PSU 102), the power supply unit transmits, to a digital logic module 120, a signal representing a power supply state of the single power supply unit (such as the first signal described below), whereas from the perspective of the digital logic module 120, the digital logic module receives, from the plurality of power supply units, the signals representing the power supply states of the respective power supply units (such as a plurality of first signals), respectively. The digital logic module 120 may include AND gates and OR gates and be coupled to all PSUs. The system load 110 is an electronic device, such as a memory and the like. Besides, although the plurality of power supply units and the digital logic module are demonstrated as separated means, they can also be integrated in a single power source.

Figure 2:
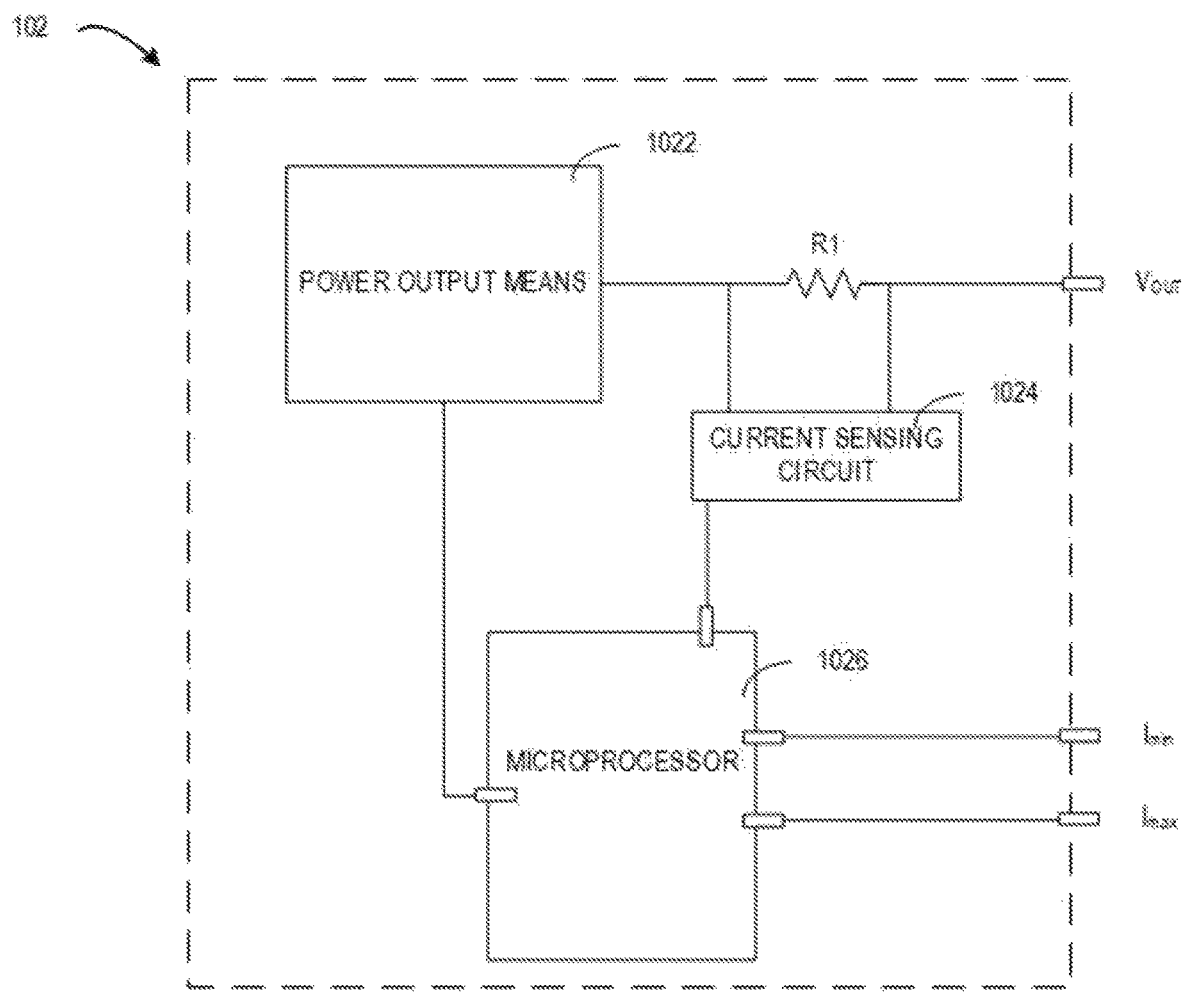
FIG. 2 is a schematic diagram of an example of a power supply unit in FIG. 1.

FIG. 2 illustrates a schematic diagram of an example of the PSU 102 in FIG. 1. It can be understood that the PSUs 104 and 106 have an essentially same or similar configuration as that of the PSU 102. The PSU 102 includes a power output means 1022, a resistor R1, a current sensing circuit 1024 and a microprocessor 1026. The power output means 1022 supplies power via the resistor R1 to the load at the port $V_{OUT}$. The current sensing circuit 1024 detects the voltage across the resistor R1 to determine the current flowing from the power output means 1022 and being provided to the load.

The microprocessor 1026 receives the voltage value across the resistor R1 and converts it into a pulse width signal representing the voltage value. In this context, each pulse width signal corresponding to the supply current value can be referred to as "the first signal" for the sake of discussion. It will be appreciated that, depending on the number of PSUs, there are a corresponding number of first signals. The microprocessor 1026 outputs via a port $I_{min}$ or $I_{max}$ a first signal to the digital logic module 120. Although outputting the first signal to the digital processing module 120 via the microprocessor 1026 has been shown, there may be other signal transmission methods as well. For example, the voltage across the resistor R1 is transmitted to the digital logic module 120 via other conversion means, or the current sensing circuit 1024 directly converts it into a pulse width modulation signal and directly transmits the pulse width modulation signal to the digital logic module 120.

The digital logic module 120 receives the first signals I_1, I_2 and I_3 from the PSUs 102, 104 and 106, and then performs logic "AND" and "OR" operations on the first signals I_1, I_2 and I_3, so as to determine the maximum supply current $I_{max}$ and the minimum supply current $I_{min}$. In this context, the signal representing the maximum supply current $I_{max}$ is referred to as "the second signal" and the signal representing the minimum supply current $I_{min}$ is referred to as "the third signal." Then, the digital logic module 120 transmits the second signal and the third signal to each PSU.

The PSU receives the second signal and the third signal via the ports $I_{max}$ and $I_{min}$, respectively. The microprocessor 1026 determines the average current based on the received second and third signals, and then controls (1022) the output current based on the average current and the current supply current. Although the port $I_{max}$ or $I_{min}$ is shown to bidirectionally transmit signals in a distributed mode, the microprocessor 1026 can also have a separate output port, which is different from the port $I_{max}$ or $I_{min}$, to output the first signal to the digital logic module 120.

Figure 3:
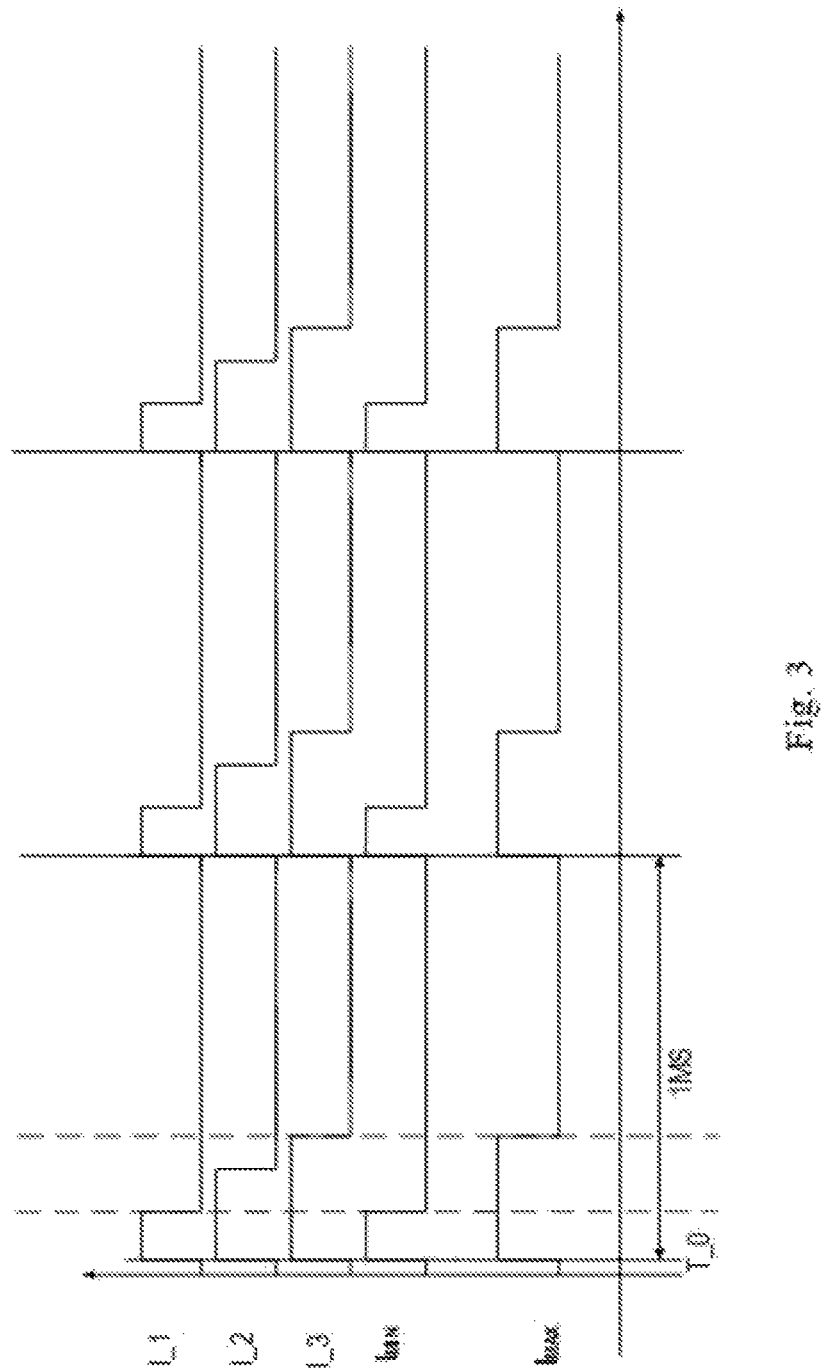
FIG. 3 illustrates a schematic diagram of waveforms of output voltages of components in FIG. 1.

FIG. 3 illustrates a schematic diagram of waveforms of output voltages of components in FIG. 1. As an example, the operations of the digital logic module 120 are described below with reference to FIG. 3. In FIGS. 3, I_1, I_2 and I_3 represent the first signal from the PSUs 102, 104 and 106, respectively. The first signal is a pulse width modulation signal and its width represents the magnitude of the supply current. It can be appreciated that the supply current can be detected at the same time, in order to obtain more accurate supply current information. For example, the first signals in the same cycle can be obtained using the clock in an interruptive manner. The digital logic module 120 performs logic AND and OR operations on the first signals from the PSUs 102, 104 and 106 in the same cycle (for example 1 ms is a cycle). Through the logic OR operation, the first signal having the minimum width (for example I_1) can be determined as $I_{min}$. Through the logic AND operation, the first signal having the maximum width (for example I_3) can be determined as $I_{max}$. The digital logic module 120 then transmits both the second signal $I_{max}$ and the third signal $I_{min}$ to the PSUs 102, 104 and 106.

Figure 4:
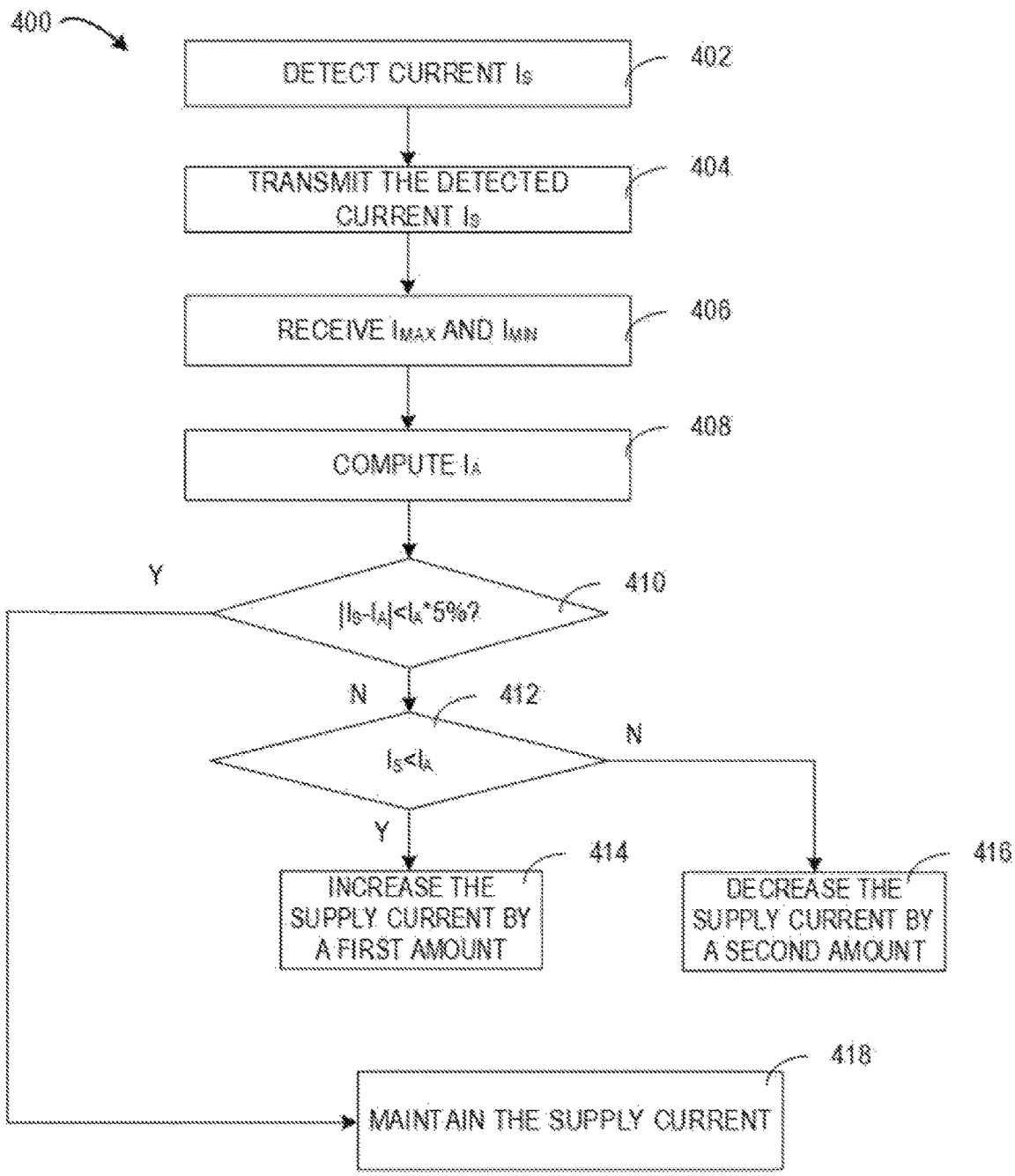
FIG. 4 illustrates a flowchart of a method of balancing currents according to embodiments of the present disclosure.

FIG. 4 illustrates a flowchart of a method 400 for balancing currents according to embodiments of the present disclosure. For example, the method 400 can be implemented by the PSUs 102, 104 and 106 in the power supply system of FIG. 1. At 402, the current sensing circuit 1024 detects the current supply current 402. The current sensing circuit 1024 transmits the detected voltage signal representing the supply current $I_s$ to the microprocessor 1026. The microprocessor 1026 then converts the voltage signal into a pulse width modulation first signal.

At 404, the microprocessor 1026 transmits the first signal to the digital logic module 120. As stated above, the digital logic module 120 performs logic operations on the first signals from the PSUs 102, 104 and 106 to determine the second signal and the third signal representing $I_{max}$ and $I_{min}$.

At 406, the microprocessor 1026 in each PSU receives the second signal and the third signal representing $I_{max}$ and $I_{min}$ via the port $I_{max}$ and $I_{min}$, respectively.

At 408, the microprocessor 1026 computes the average supply current signal $I_a$ based on $I_{max}$ and $I_{min}$, for example, the median of $I_{max}$ and $I_{min}$ can be determined as the average supply current. It can be understood that the above determination method is only an example and the average supply current can also be determined by other methods, for example each $I_s$ can be added up and the sum can be averaged to obtain the average supply current.

At 410, the microprocessor 1026 computes the absolute value of the difference between the current supply current $I_s$ and the average supply current $I_a$, and determines whether the absolute value is below a predetermined threshold, such as 5% of the average supply current. It can be appreciated that 5% is only an example and other percentage values can also be used, for example 1%, 2% or the like.

In response to the absolute value of the difference being below the predetermined threshold, for example below 5% of the average supply current, at 418, the output current of the power output means 1022 is maintained without adjusting the power output means 1022. That is, the current supply current serves as the subsequent supply current for providing to the load.

At 410, if the absolute value of the difference is below the average supply current by a certain percentage, at 412, whether the current supply current is below the average supply current is determined. If the current supply current is below the average supply current, at 414, the microprocessor 1026 increases the current supply current by a first current amount. For the power output means 1022, the current can be increased in various ways. For example, the microprocessor 1026 can increase the output voltage of the power output means 1022 by a first voltage amount (such as 50 mV) by adjusting the pulse modulation signals to the power output means 1022, such that the current supply current provided to the load is forced to be increased by a first current amount as the subsequent supply current.

If the current supply current is below the average supply current, at 416, the microprocessor 1026 decreases the current supply current by a second current amount. For the power output means 1022, the current can be decreased in various ways. For example, the microprocessor 1026 can decrease the output voltage of the power output means 1022 by a second voltage amount (such as 50 mV) by adjusting the pulse modulation signals to the power output means 1022, such that the current supply current provided to the load is forced to be increased by a second current amount as the subsequent supply current.

It can be appreciated that the flowchart in FIG. 4 is only an example and other methods can be used to control subsequent supply currents for the load. For example, the output voltage of the power output means 1022 is adjusted based on the current supply current and the average supply current. In an example, the output voltage adjusting amount is $\Delta V = 1*(I_a - I_s)/I_a (V)$. For example, if $I_s = I_a * 95\%$, the microprocessor 1026 increases the output voltage of the power output means 1022 by 50 mV. If $I_s = I_a * 102\%$, the microprocessor 1026 decreases the output voltage of the power output means 1022 by 20 mV.

It will be appreciated that while an embodiment of the method of the present disclosure has been described according to the acts in the sequence of the flowchart, the acts of the embodiments of the present disclosure are not necessarily performed in the order described above. There may be some other combinations and sequences of the blocks.

Figure 5:
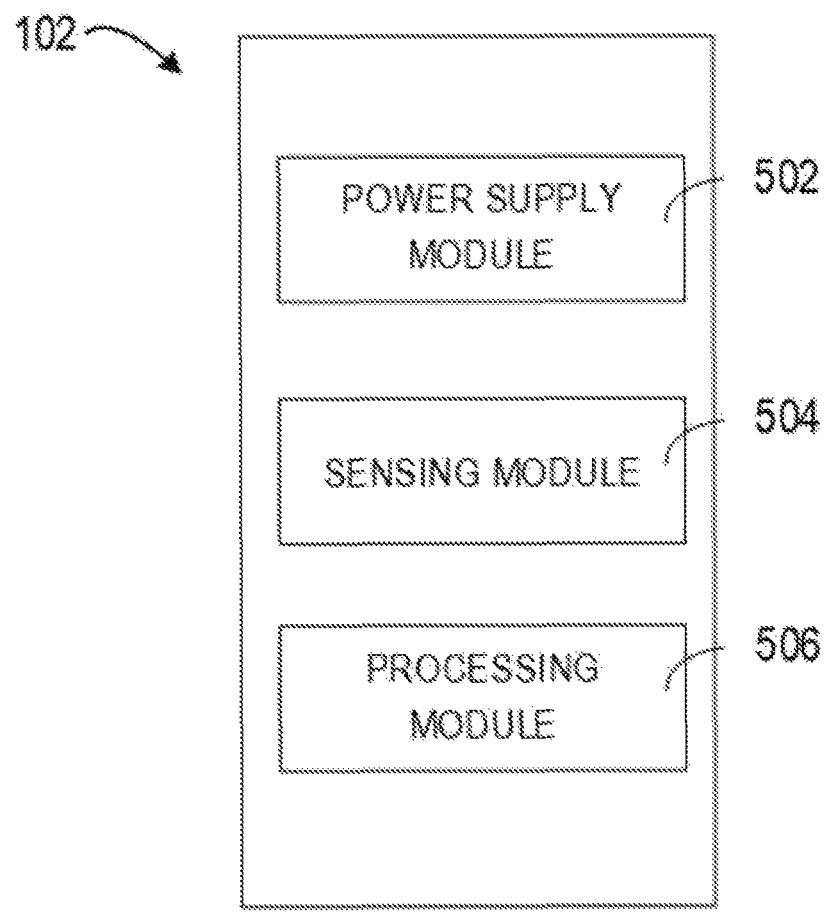
FIG. 5 illustrates a schematic block diagram of a power supply unit in FIG. 1.

FIG. 5 illustrates a schematic block diagram of an example of the power supply unit in FIG. 1. As shown, the power supply unit includes a power supply module 502, a sensing module 504 and a processing module 506. It can be understood that the PSU 102, PSU 104 and PSU 106 have essentially the same or similar configuration as that of the power supply unit. The power supply module 502 is configured to supply power to the load, such as memory and the like. The sensing module 504 is configured to sense the current supply current. The processing module 506 is configured to transmit a pulse width modulation signal representing the current supply current to an external digital logic module, receives the pulse width modulation signals representing the maximum supply current and the minimum supply current from the digital logic module, and determines the subsequent supply current provided to the load based on the current supply current, the maximum supply current and the minimum supply current. Features related to operations/functions of each module have been described above and will not be repeated here.

It will be appreciated the each module of the power supply unit shown in FIG. 5 can be implemented by hardware. For example, one or more of the above modules 502, 504 and 506 can be implemented as hardware modules, including but not limited to: Integrated Circuit (IC) chip, Application-Specific Integrated Circuit (ASIC) chip, System-On-Chip (SOC), Field Programmable Gate Array (FPGA) and the like.

Alternatively or additionally, some or all of the modules of the power supply unit can be implemented by software. For example, in one embodiment, the power supply unit can be implemented as a computer program product tangibly included in a storage medium accessible by the device and executed by the controller in the device.

Figure 6:
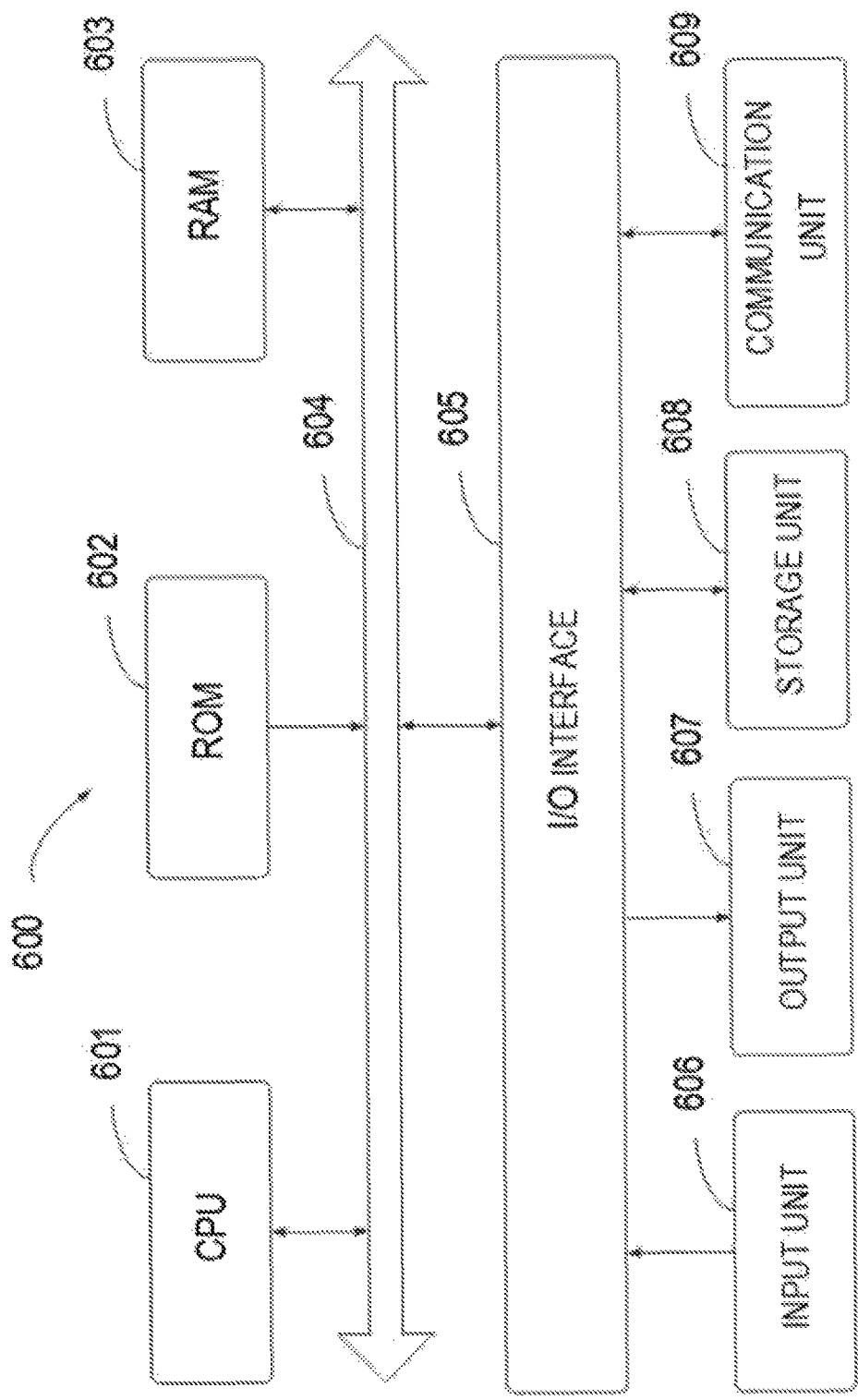
FIG. 6 is a schematic block diagram of a device for implementing embodiments of the present disclosure.

FIG. 6 illustrates a schematic diagram of a device 600 for implementing embodiments of the present disclosure. The device 600 can be the system 100 described above. As shown, the device 600 includes a central process unit (CPU) 601, which can act as the above described controller 610. The CPU 601 can perform various suitable acts and processing based on the computer program instructions stored in the read-only memory (ROM) 602 or the computer program instructions loaded into the random-access memory (RAM) 603 from the storage unit 608. Various kinds of programs and data required by the operations of the device 600 can also be stored in the RAM 603. CPU 601, ROM 602 and RAM 603 are connected to each other via a bus 604. The input/output (I/O) interface 605 is also connected to the bus 604.

A plurality of components in the device 600 are connected to the I/O interface 605, including: an input unit 606, such as a keyboard, a mouse and the like; an output unit 607, such as various kinds of displays and loudspeakers and the like; a storage unit 608, such as a disk and an optical disk and the like; and a communication unit 609, such as a network card, a modem, a wireless communication transceiver and the like. The communication unit 609 allows the device 600 to exchange information/data with other devices via the computer network, such as the Internet, and/or various telecommunication networks.

The device 600 also includes a plurality of batteries or PSU (not shown). A plurality of power supply device, such as the batteries and PSUs 102, 104 and 16, can be used for supplying power to the CPU 601, the ROM 602, the RAM 603, the input unit 606, the storage unit 608 and the communication unit 609.

Each procedure and processing described above, such as the method 400, can also be performed by the processing unit 601 besides the microprocessor 1026. For example, in some embodiments, the method 400 can be implemented as a computer software program tangibly included in the machine-readable medium, for example the storage unit 608. In some embodiments, the computer program can be partially or fully loaded and/or mounted to the device 600 via the ROM 602 and/or the communication unit 609. When the computer program is loaded to the RAM 603 and executed by the CPU 601, acts in one or more blocks of the above described method 400 can be implemented.

Generally speaking, various embodiments of the present disclosure can be implemented by hardware or dedicated circuit, software, logic, or any combinations thereof. Some aspects can be implemented by hardware while other aspects can be implemented by firmware or software, in which the firmware or the software can be executed by the controller, the microprocessor or other computing devices. Although aspects of the present disclosure is illustrated and described as block diagram and flow chart or represented using some other graphs, it should be understood that the block, device, system, technology or method described herein can be implemented by hardware, software, firmware, dedicated circuit or logic, universal hardware, or controller or other computing devices, or any combinations thereof in a non-restrictive manner.

Moreover, although the operations are described in a particular order, it should not be construed that these operations are required to be performed according to the sequence shown or in succession, or all operations shown are required to be performed to achieve a desired outcome. In some cases, multi-tasking or parallel processing can be beneficial. Likewise, although details of several implementations are included in the above discussion, they should not be interpreted as any restrictions on the scope of the present disclosure, instead, the descriptions of the features are only directed to the particular embodiments. Some features described in separate embodiments can also be implemented in one single embodiment in combination. On the contrary, various features described in a single embodiment can also be implemented in several embodiments separately or in any suitable sub-combinations.

Although the present disclosure has been described with specific structure features and/or method acts, it should be understood that the present disclosure defined in the attached claims does not necessarily restrict to the above described particular features or acts. The above described particular features and acts are disclosed only as example forms for implementing the claims.

We claim:

1. A method of balancing a supply current, comprising:
    detecting a current supply current for a load;
    transmitting, to a digital logic module, a first signal representing the current supply current;
    receiving, from the digital logic module, a second signal representing a maximum supply current and a third signal representing a minimum supply current; and
    determining a subsequent supply current for the load based on the current supply current, the maximum supply current, and the minimum supply current;
    wherein determining a subsequent supply current for the load comprises:
        determining an average supply current based on the maximum supply current and the minimum supply current; and
        determining the subsequent supply current based on the average supply current and the current supply current.

2. The method of claim 1, wherein determining an average supply current comprises:
    computing a median of the maximum supply current and the minimum supply current as the average supply current.

3. The method of claim 1, wherein determining a subsequent supply current for the load comprises:
    determining a difference between the average supply current and the current supply current; and
    determining the subsequent supply current based on the difference.

4. The method of claim 3, wherein determining the subsequent supply current based on the difference comprises:

in response to the difference being below a predetermined threshold, maintaining the current supply current as the subsequent supply current.

5. The method of claim 3, wherein determining the subsequent supply current based on the difference comprises:
in response to the difference being above a predetermined threshold and the average supply current being above the current supply current, increasing the supply current by a first current amount as the subsequent supply current.

6. The method of claim 4, wherein determining the subsequent supply current based on the difference comprises:
in response to the difference being above the predetermined threshold and the average supply current being below the current supply current, decreasing the current supply current by a second current amount as the subsequent supply current.

7. The method of claim 5, wherein increasing the supply current by a first current amount comprises:
increasing an output voltage for the load by a first voltage amount.

8. The method of claim 6, wherein decreasing the supply current by a second current amount comprises:
decreasing an output voltage for the load by a second voltage amount.

9. A device for supplying power, comprising:
a power output circuit configured to output a current supply current to a load;
a current sensing circuit configured to sense the current supply current; and
a microprocessor configured to:
receive, from the current sensing circuit, a first signal representing the supply current;
transmit the first signal to a digital logic module;
receive, from the digital logic module, a second signal representing a maximum supply current and a third signal representing a minimum supply current; and
determine a subsequent supply current for the load based on the current supply current, the maximum supply current and the minimum supply current;
wherein the microprocessor is further configured to:
determine an average supply current based on the maximum supply current and the minimum supply current; and
determine the subsequent supply current based on the average supply current and the current supply current.

10. The device of claim 9, wherein the microprocessor is further configured to compute a median of the maximum supply current and the minimum supply current as the average supply current.

11. The device of claim 9, wherein the microprocessor is further configured to:
determine a difference between the average supply current and the current supply current; and
determine the subsequent supply current based on the difference.

12. The device of claim 11, wherein the microprocessor is configured to determine the subsequent supply current based on the difference by:
in response to the difference being below a predetermined threshold, maintaining the current supply current as the subsequent supply current.

13. The device of claim 11, wherein the microprocessor is configured to determine the subsequent supply current based on the difference by:
in response to the difference being above a predetermined threshold and the average supply current being above the current supply current, increasing the supply current by a first current amount as the subsequent supply current.

14. The device of claim 11, wherein the microprocessor is configured to determine the subsequent supply current based on the difference by:
in response to the difference being above a predetermined threshold and the average supply current being below the current supply current, decreasing the current supply current by a second current amount as the subsequent supply current.

15. The device of claim 13, wherein the microprocessor is configured to increase the supply current by a first current amount by increasing an output voltage for the load by a first voltage amount.

16. The device of claim 14, wherein the microprocessor is configured to decrease the supply current by a second current amount by decreasing an output voltage for the load by a second voltage amount.

17. A power source, comprising:
a plurality of devices for supplying power according to claim 9; and
a digital logic circuit configured to receive a plurality of current supply currents, to determine, based on the plurality of current supply currents, the second signal representing the maximum supply current and the third signal representing the minimum supply current, and to transmit the second and third signals to the plurality of devices.

18. The device of claim 9 wherein the power output circuit includes:
a set of uninterruptible power supplies constructed and arranged to operate as a source of the current supply current to the load.

19. The device of claim 9 wherein the power output circuit includes:
a set of batteries constructed and arranged to operate as a source of the current supply current to the load.

20. The device of claim 9 wherein the power output circuit includes:
a set of uninterruptible power supplies and a set of batteries constructed and arranged to operate as a source of the current supply current to the load.

* * * * *